United States Patent Office 3,119,793
Patented Jan. 28, 1964

3,119,793
LINEAR POLYUREAS PREPARED FROM THE REACTION OF UREA AND TWO DIFFERENT ALKYLENE DIAMINES
Yanosuke Inaba and Koji Kimoto, Fujisawa City, Japan, assignors to Toyo Koatsu Industries, Incorporated, Tokyo, Japan, a corporation of Japan
No Drawing. Filed Oct. 7, 1959, Ser. No. 844,865
Claims priority, application Japan Oct. 22, 1958
6 Claims. (Cl. 260—77.5)

The present invention relates generally to improvements in synthetic organic thermoplastic materials and it relates more particularly to an improved method of producing polyurea type thermoplastic materials as well as to the resulting product.

Fibers formed of polyureas having linearly arranged alkylene radicals have excellent physical and chemical properties. They possess a high tenacity and good elastic recovery, a desirable Young's modulus and high chemical resistance. However, polyurea resins produced by the conventional methods have relatively high melting points so that they are very difficult to spin into fibers from the molten state as compared with other synthetic organic thermoplastic materials employed as fibers. This is particularly true where the polyureas have short chain alkylene radicals. With linear polyureas with six or less carbons in the alkylene group the melting point of the plastic is higher than the thermal dissociation temperature making it extremely difficult to spin the polymer without decomposition. Furthermore, conventionally produced polyurea is highly crystalline as compared with other synthetic polymers and possesses the defect of being brittle when molded or otherwise processed.

It is therefore a principal object of the present invention to provide an improved synthetic organic thermoplastic material and a process of its production.

Another object of the present invention is to provide an improved process of producing polyurea type material and the improved product resulting therefrom.

Still another object of the present invention is to provide an improved polyurea material capable of being spun into fibers, characterized by its relatively low melting point, low crystallinity and brittleness, high tenacity, desirable Young's modulus and good dyeing properties.

The present invention is based primarily upon the discovery that a highly superior polyurea type material is produced by reacting urea or its equivalent and two or more alkylenediamines or their equivalents, the alkylenediamines having different numbers of carbons in the alkylene radicals and the reaction being effected in the presence of viscosity stabilizer whose function will be hereinafter set forth. The alkylenediamines preferably contain at least six carbons, which may be linearly arranged and the carbonates thereof may be likewise employed. The urea and alkylenediamines are preferably empolyed approximately in equal molar ratio. The ratio of the alkylenediamine compounds to said urea can be between 1 to 1 and 1.5 to 1. According to a preferred method of producing the improved polyurea material, a mixture of the different alkylenediamines and a substantially equal molar quantity of urea are dissolved in water or an organic solvent selected from such an OH radical containing aromatic compounds together with the viscosity stabilizer and reacted at a relatively low temperature preferably in the range of 100° C. to 130° C. The temperature is then raised preferably to about 220° C. to 270° C. and the reaction continued and thereafter the pressure is reduced and the reaction permitted to proceed for a time sufficient to form a condensation product capable of being spun into fibers or molded into various articles. The above process is conducted in the presence of an inert gas, such as nitrogen, in order to exclude air, oxygen and other gases which would adversely affect the process and end products.

The initial reaction being effected at relatively low temperatures, results in the production of a two molecule condensation product of urea and a combination of the alkylenediamines in which one molecule of each of the alkylenediamines combines with a molecule of the urea. As aforesaid, it is preferable to employ water as a solvent, but the reaction may be nearly smoothly effected in the absence of the said solvents since the different alkylenediamines are mutually soluble. The reaction is not significantly effected by any variations in the speeds of reaction of the different alkylenediamines due to the difference in the number of carbons in the alkylene radicals and the result is a uniform polymer.

Since the polyurea copolymer obtained by the present process has a tendency toward depolymerization by dissociation of the isocyanate radical and amino-radical through the dearrangement of urea at high temperatures, it has been found necessary to prevent such depolymerization by changing the form of the terminating radical to that of other than urea. For this purpose, a small amount of a viscosity stabilizer, such as a monobasic acid, an alkylmonoamide or an N-acyl-alkylenediamine is introduced into the reaction system at any stage before the reactant becomes super-polymer. The alkyl-radical of the alkyl-monoamide and the monobasic acid or alkyleneradical of the N-acyl-alkylenediamine should have at least three and preferably six or more carbons.

The polyurea copolymer material produced by the present process has a relatively low crystallinity as compared to conventionally produced polyurea materials, and products or films molded therefrom possess a high strength and reduced brittleness. Fibers, formed of the improved polyurea material, are characterized by their highly improved dyeing properties in acid and dispersed dyes, excellent crimp stability, improved modulus of elasticity and other physical and chemical properties. Moreover the chemical and physical properties of the polyurea material may be adjusted by varying the molar ratios of the different alkylenediamines. It has found that when two different alkylenediamines are employed in equal molar amounts a material having a low melting point is produced, the melting point being considerably lower than the decomposition temperature of the resin, thereby greatly facilitating the spinning of the resin into fibers. The resulting fibers possess low crystallinity and good dyeability. Furthermore, even when the molar ratio of the alkylenediamines is varied from 1:1 a fiber can be produced having a good crimp stability, a high coefficient of elasticity close to that of the conventional polyurea product and good dyeability.

This application is a continuation-in-part of Inaba et al., U.S. Patent 2,973,342, issued February 28, 1961, on application Serial No. 765,308, filed October 6, 1958.

The following examples in which the parts are given by weight, are illustrative of the present invention:

*Example 1*

39.5 parts of nonamethylenediamine, 87 parts of hexamethylenediamine, 60 parts of urea and 2.6 parts of palmitic acid amide were dissolved in three times the amount of m-cresol and the solution was heated for several hours at 120° C. and the heating continued for several hours at an increased temperature of 180° C. in the presence of a substantially pure nitrogen atmosphere. The solution poly-condensated releasing ammonia and gradually reached a viscous state. After ten hours the temperature was again raised to 250° C. distilling off the solvent at a reduced pressure to leave a molten mass which could be readily spun into fibers. The resulting polyurea copolymer had an intrinsic viscosity in m-cresol of 0.7 to 1.0, a melting point of 225° C. to 235° C. Fibers spun from the copolymer closely resembled nylon in appearance and had a tenacity of 4 to 5 grams per denier and a Young's modulus of 400 to 500 kg./mm.² which is substantially equal to that of conventionally produced polyurea. The dyeing speed was two to three times faster than that of polyurea derived from a single diamine and its crystallinity ten percent lower and hence its lower brittleness, thereby improving its usefulness in molded articles and film. Its crimp stability and other physical and chemical properties were excellent.

Example 2

68 parts of nonamethylenediamine carbonate, 125 parts of octamethylenediamine carbonate, 60 parts of urea and 2.6 parts of N-caproylnonamethylenediamine were dissolved in 40 parts of water and the solution was heated at a temperature of 100° C. for several hours and the temperature was thereafter slowly raised to 250° C. with the distilling off of water, the solution releasing ammonia and reaching a viscous state. The reaction was effected in a nitrogen atmosphere. The heating at 250° C. was continued for one to two hours and the reaction continued to completion for several hours at 250° C. and at a reduced pressure to obtain a molten mass which could be readily spun into fibers. The condensation product had an intrinsic viscosity in m-cresol of 0.7 to 0.9 and a melting point of 220° C. to 230° C. and the fiber tenacity was between 4 and 5 grams per denier. The Young's modulus was 300 to 400 kg./mm.² and the crimp stability and other physical properties were excellent. The dyeing rate was fast and the crystallinity low as compared to the conventionally produced polyurea.

Example 3

A mixture of 94 parts of octamethylenediamine carbonate, 58 parts of hexamethylenediamine, 60 parts of urea and 1.6 parts of polargonic acid amide placed in a sealed vessel containing an inert atmosphere such as nitrogen gas, was heated to a temperature of 120° C. for several hours and the temperature then slowly raised to 240° C., the molten mass releasing ammonia and becoming viscous. The mass was kept at 240° C. for one to two hours and the reaction then continued at this temperature and at a reduced pressure for several hours to produce a molten mass which could be readily spun into fibers. The condensation product had an intrinsic viscosity in m-cresol of 0.7 to 0.9, a melting point of 210° C. to 220° C. and the fiber spun therefrom had a tenacity of 4 to 5 grams per denier and a Young's modulus of 250 to 450 kg./mm.². The crimp stability and other physical properties were excellent, the dyeability was many times better than the conventional polyurea and the crystallinity 10 to 20% lower.

Example 4

A solution of 79 parts of nonamethylenediamine, 36 parts of octamethylenediamine, 29 parts of hexamethylenediamine, 60 parts of urea and 1.2 parts of caproic acid amide in 50 parts of water was heated at 100° C. for several hours and the temperature slowly raised to 250° C. in the presence of a pure nitrogen atmosphere, water being distilled off and the mass reaching a viscose state with the release of ammonia. The mass is then kept at a temperature of 250° C. in the nitrogen atmosphere for several hours at a reduced pressure until the reaction was completed and a molten mass produced which could be readily spun into fibers. The resulting condensation product had an intrinsic viscosity in m-cresol of 0.7 to 0.9, a melting point of 215° C. to 225° C. and the fiber spun from the condensation product had a tenacity of 4 to 5 grams per denier, excellent crimp stability, dyeability and other physical properties and a low crystallinity.

The following is a table of some of the properties of polyureas produced in accordance with the present invention as compared with those of certain conventionally produced polyureas:

| Components | Mol ratio | M.P., ° C. | Decomposition temperature, ° C. | Dyeability $k$ [1] | Degree of crystallization, percent [2] | Resistance to light, percent [3] |
|---|---|---|---|---|---|---|
| C₉ diamine | | 236 | 282 | 5 | 70 | 46 |
| C₉:C₈ diamine | 1:1 | 211 | 278 | 51 | 55 | 70 |
| Do | 1:4 | 241 | 279 | 32 | 65 | 70 |
| Do | 1:2 | 225 | 280 | 40 | 60 | 72 |
| C₈ diamine | | 260 | 280 | 26 | 70 | 45 |
| C₈:C₆ | 1:1 | 218 | 279 | 540 | 60 | 56 |
| Do | 4:1 | 235 | 280 | 210 | | 60 |
| C₆ diamine | | 300 | 280 | | | |
| C₉:C₆ diamine | 1:1 | 227 | 281 | 138 | 50 | 75 |
| Do | 1:2 | 230 | 279 | 170 | 57 | 75 |
| Do | 1:5 | 235 | 279 | 160 | 60 | 70 |

[1] Dyeability with acid dyestuff:

$k$=Velocity constant of dyeing (mg./g. hr.) from the following formula:

$$\frac{dx}{dt} = k\frac{s-x}{x}$$

$s$ Saturated color concentration in fiber.
$x$ Color concentration in fiber at t. hr. from start.
[2] Calculated from observed value of density.
[3] Variation of tenacity of fiber after exposing to light for 100 hrs. by fade-tester.

It can readily be observed from the above table that the polyurea copolymers of the present invention have for the most part considerably lower melting points than those of the corresponding conventional polyureas and that their decomposition temperatures are substantially the same. This greatly facilitates and expedites the spinning and extrusion of the polymer. In addition the dyeability of the polyurea copolymer by this invention is radically superior to that of the conventional polyureas, their crystallinity and hence brittleness less and their resistance to light greater. It should be noted that in addition to the alkylenediamines described above other alkylenediamines may be employed as well as their carbonates, for example, decamethylenediamine, undecamethylenediamine, dodecamethylenediamine, and their carbonates. Examples of monobasic acids which may be employed as viscosity stabilizers are palmitic acid, caproic acid and pelargonic acid. The molar ratio of the urea component to the viscosity stabilizer may be of the order of approximately 50:1 to 100:1.

As many apparently widely different embodiments of this invention may be made without departure from the spirit and scope thereof, it is to be understood that the present invention is not limited to the specific embodiments thereof except as defined in the appended claims.

What is claimed is:

1. The method of producing polyurea copolymers capable of being readily spun into fibers comprising reacting in an inert atmosphere, urea and at least two members selected from the group consisting of linear alkylene diamines having from 6 to 12 carbon atoms in the alkylene chain and their carbonates, said members having different numbers of carbon atoms in their alkylene chains, in contact with a viscosity stabilizer, in a solvent selected from the group consisting of water and meta-cresol, at a temperature of 100° C. to 130° C. to produce an intermediate reaction product and thereafter raising the temperature to 220° C. to 270° C. to form a spinnable, fiberforming polyurea copolymer.

2. The method according to claim 1 wherein the molar ratios of said members to urea is between 1:1 and 1.5 to 1.

3. The method according to claim 1 wherein said members are nonamethylenediamine and hexamethylenediamine; the viscosity stabilizer is palmitic acid amide and the solvent is meta-cresol.

4. The method according to claim 1 wherein said members are nonamethylenediamine carbonate and octamethylenediamine carbonate; the viscosity stabilizer is N-caporyl-nomamethylenediamine and the solvent is water.

5. The method according to claim 1 wherein said members are octamethylenediamine carbonate and hexamethylenediamine and the viscosity stabilizer is pelargonic acid amide.

6. The method according to claim 1 wherein said members are nonamethylenediamine, octamethylenediamine and hexamethylenediamine; the viscosity stabilizer is caproic acid amide and the solvent is water.

References Cited in the file of this patent

UNITED STATES PATENTS

| | | |
|---|---|---|
| 2,145,242 | Arnold | Jan. 31, 1939 |
| 2,279,294 | Hardman | Apr. 14, 1942 |
| 2,816,879 | Wittbecker | Dec. 17, 1957 |
| 2,833,744 | Neher | May 6, 1958 |
| 2,973,342 | Inaba | Feb. 28, 1961 |
| 3,046,254 | Inaba | July 24, 1962 |

OTHER REFERENCES

Urylon—Inaba et al. (a publication by the Central Research Laboratory), Yokohama, Japan, 28 pages, October 6, 1959.